United States Patent [19]

Bamberger et al.

[11] 3,996,343
[45] Dec. 7, 1976

[54] PROCESS FOR THERMOCHEMICALLY PRODUCING HYDROGEN

[75] Inventors: Carlos E. Bamberger; Donald M. Richardson, both of Oak Ridge, Tenn.

[73] Assignee: The United States of America as represented by the United States Energy Research and Development Administration, Washington, D.C.

[22] Filed: Jan. 27, 1976

[21] Appl. No.: 647,463

[52] U.S. Cl. .............................. 423/657; 423/579; 423/595; 423/607; 423/648
[51] Int. Cl.² ..................... C01B 1/02; C01B 13/02; C01G 37/02; C01G 37/00
[58] Field of Search .......... 423/657, 579, 595, 648, 423/607

[56] References Cited
UNITED STATES PATENTS

| | | |
|---|---|---|
| 3,017,250 | 1/1962 | Watkins ............................ 423/657 |
| 3,927,192 | 12/1975 | Bamberger et al. ........... 423/657 X |

*Primary Examiner*—Edward Stern
*Attorney, Agent, or Firm*—Dean E. Carlson; David S. Zachry; John B. Hardaway

[57] ABSTRACT

Hydrogen is produced by the reaction of water with chromium sesquioxide and strontium oxide. The hydrogen producing reaction is combined with other reactions to produce a closed chemical cycle for the thermal decomposition of water.

4 Claims, 2 Drawing Figures

PROCESS FOR THERMOCHEMICALLY PRODUCING HYDROGEN

BACKGROUND OF THE INVENTION

This invention was made in the course of or under a contract with the Energy Research and Development Administration. It relates generally to the art of thermochemical hydrogen production.

Hydrogen is presently an attractive energy source for use in future energy systems. Hydrogen has many attributes which make it a logical replacement for fossil fuels which are being rapidly consumed. Combustion of hydrogen produces only water as a product and thus does not suffer from the detrimental environmental effects of conventional fossil fuels. Existing fuel transport and consumption equipment can be adapted for hydrogen utilization. Automobiles, for example, have been constructed to operate on hydrogen using a modified conventional internal combustion engine. Vast quantities of hydrogen are also needed for use in coal gasification and liquefaction processes and in the production of ammonia. The inevitability of increased hydrogen utilization is thus evident.

Conventionally, hydrogen has been produced from water by electrolysis. Electrolysis, however, is highly inefficient when considering the efficiency present in electricity production coupled with an efficiency of about 80% for electrolysis. Inherent in the electrolysis to produce hydrogen is the general futility of using one energy source typically fossil fuels at the point of electricity production to ultimately produce hydrogen at the point of electrolysis. The disadvantages and excess consumption of fossil fuels are obviously not overcome by such a process. Chemical processes for the direct conversion of fossil fuels and water into a hydrogen product are presently at the point of feasibility. These processes overcome many of the inefficiencies and disadvantages of electrolysis. These processes, however, still depend upon the use of fossil fuels in the energy scheme.

Thermochemical processes present the most attractive means for producing hydrogen. These processes normally involve a series of reactions which produce hydrogen from water. The reactions are desirably carried out in a closed cyclic manner such that all products except hydrogen and oxygen are reused as reactants. One such process is disclosed in U.S. Pat. No. 3,490,871 which utilizes the reaction of cesium with water to release hydrogen. Another such process is disclosed in commonly assigned U.S. Pat. No. 3,919,406 of Nov. 11, 1975 to Grimes et al. filed application Ser. No. 487,323 of July 10, 1974, which involves the reaction of copper and magnesium chloride with water to produce hydrogen in a closed cyclic manner. Another such process is disclosed in commonly assigned U.S. Pat. No. 3,927,192 of common inventorship of Dec. 16, 1975. The process disclosed therein comprises a reaction between chromium oxide and an alkali metal hydroxide to produce hydrogen, water, and an alkali metal chromate. Commonly assigned U.S. Pat. No. 3,929,979 of Dec. 30, 1975 to Bamberger et al. discloses another closed cyclic process for splitting water wherein magnetite is reacted with an alkali metal hydroxide to produce hydrogen, alkali metal ferrite and water as products. All thermochemical processes have as an object the direct utilization of heat from an energy producing facility such as a nuclear reactor or solar furnace. The upper temperature limit of such sources is presently about 1300° K for a high temperature gas cooled reactor and about 3500° K for a solar furnace.

SUMMARY OF THE INVENTION

It is thus an object of this invention to provide a novel hydrogen producing reaction.

It is a further object of this invention to provide a cyclic thermochemical process for splitting water into hydrogen and oxygen.

It is a still further object of this invention to provide such processes wherein no reactions are carried out at a temperature above 1300° K.

These and other objects are accomplished by a process comprising the reaction of chromium sesquioxide and strontium oxide with water to produce hydrogen and strontium orthochromate IV. Additional combined reactions involving the hydrolytic disproportionation of the strontium orthochromate IV and strontium hydroxychromate V and the reaction of strontium hydroxide with strontium chromate VI to produce oxygen, strontium hydroxychromate V and water are utilized to result in a closed thermochemical process involving only three reactions.

DETAILED DESCRIPTION

In accordance with this invention it has been found that chromium sesquioxide and strontium oxide will react with steam at an elevated temperature to produce hydrogen and strontium orthochromate IV. The reaction is best carried out using intimately mixed particles of both oxides within a size range of 100 to 325 standard mesh. The reaction proceeds as follows:

$$Cr_2O_{3(s)} + 4SrO_{(s)} + H_2O_{(g)} \rightarrow 2Sr_2CrO_{4(s)} + H_{2(g)}. \quad 1.$$

Utilizing steam at approximately one atmosphere pressure, the reaction begins at about 600° C and achieves maximum hydrogen evolution at about 740° C which is the preferred temperature for carrying out this reaction. The reaction in general may be carried out at a temperature within the range of about 600° to 800° C. At the upper temperature limit the rate of hydrogen evolution decreases unless the steam pressure is increased above one atmosphere. The reaction is preferably carried out using substantially stoichiometric ratios of chromium oxide and strontium oxides. At 740° C the reaction goes to substantial completion in about three hours using the particle sizes mentioned above at a steam pressue of one atmosphere. A steam pressure in excess of one atmosphere may be utilized to enhance the kinetics of the reaction. However, the complications resulting from the increased pressure and the collection of hydrogen at the increased pressure militates against the use of higher pressures. This reaction is preferably carried out in a copper reactor having steam introduction means in the bottom and gas extraction means in the top. During the course of the reaction, product hydrogen is continuously exhausted from the top of the reaction vessel along with excess steam. Substantially pure hydrogen is collected by condensing the steam.

A great advantage of the hydrogen producing reaction of this invention is that it may be combined with two reactions to produce a closed thermochemical process for splitting water into hydrogen and oxygen. The cycle comprises the following reactions:

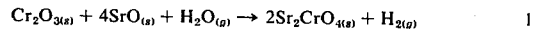   (1)

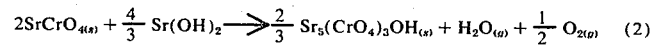   (2)

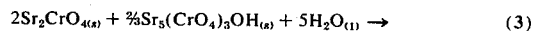   (3)

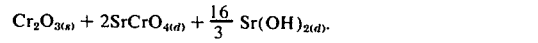

Figure 1:
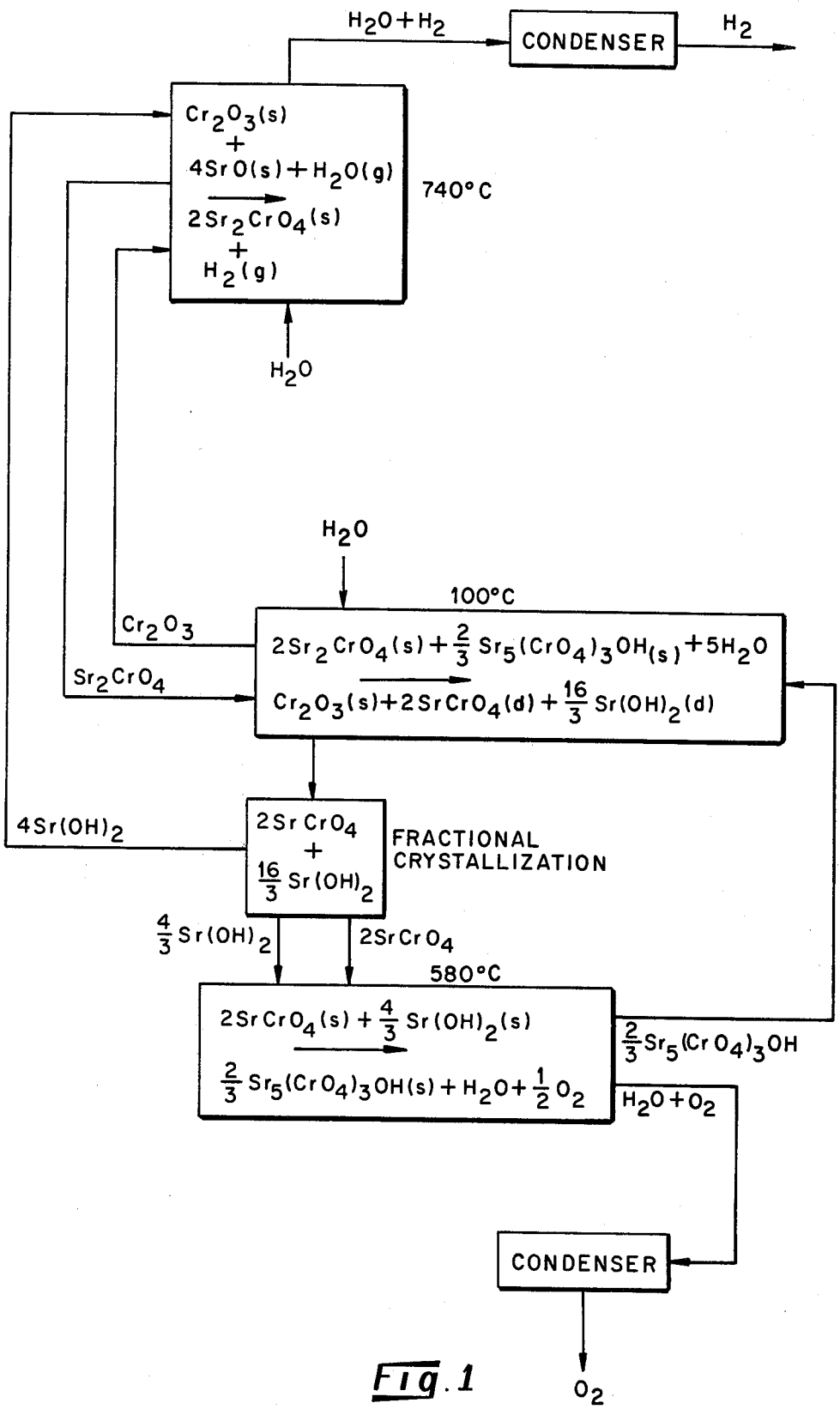
FIG. 1 is a flow chart of the process in accordance with this invention.

Combining these reactions with the thermal decomposition of strontium hydroxide, the net reaction is the decomposition of water. The overall process can best be followed with reference to the flow sheet of FIG. 1 of the drawings. Reaction (1) is carried out substantially as described above. The products from the reactor in which reaction (1) is carried out contain both water and hydrogen at an elevated temperature. By condensing the water substantially pure hydrogen is obtained as a product. The hydrogen may be additionally dried using conventional desiccants. The only product from reaction (1) after removal of the hydrogen is solid strontium orthochromate IV. This produt is utilized in reaction (3) along with strontium hydroxychromate V.

Reaction (3), the hydrolytic disproportionation of both strontium hydroxychromate V and strontium orthochromate IV, is a combination of two reactions. These reactions are:

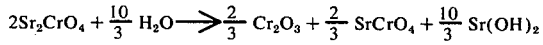

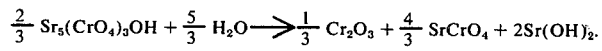

Since similar products are produced in reactions (3a) and (3b), the reactions are combined and shown as one reaction. This reaction is best carried out by continuously extracting the soluble $Sr(OH)_2$ and $SrCrO_4$ products by contacting the products with water, preferably in a Soxhlet extractor. The dissolved species thus concentrate and even precipitate in the water reservoir while the compounds to be decomposed are exposed to pure water.

Reaction (3) is preferably carried out using particles within a size range of 40 to 80 mesh. The particles must be large enough not to pass through the fritted bottom of the container used in a Soxhlet extractor. When a Soxhlet extractor is used, the reservoir preferably contains as little water as is necessary to carry out the reaction. This is generally about 1.5 to 2 times the stoichiometric requirement. If the reaction is carried out by simply boiling the reactants, about 50 times the stoichiometric amount is required to make the reaction go to completion. The hydrolytic disproportionation reaction will proceed at a temperature within the range of 25° to 100° C but preferably within the range of 80° to 100° C. It is most preferred, however, to conduct the reaction at a temperature of about 100° C where it will proceed to completion in about 10 minutes or less. The insoluble chromium sesquioxide may be recovered by conventional techniques such as filtration for reuse in reaction (1). The soluble strontium chromate and strontium hydroxide products are separated by fractional crystallization for recovery and reuse in reactions (1) and (2).

Figure 2:
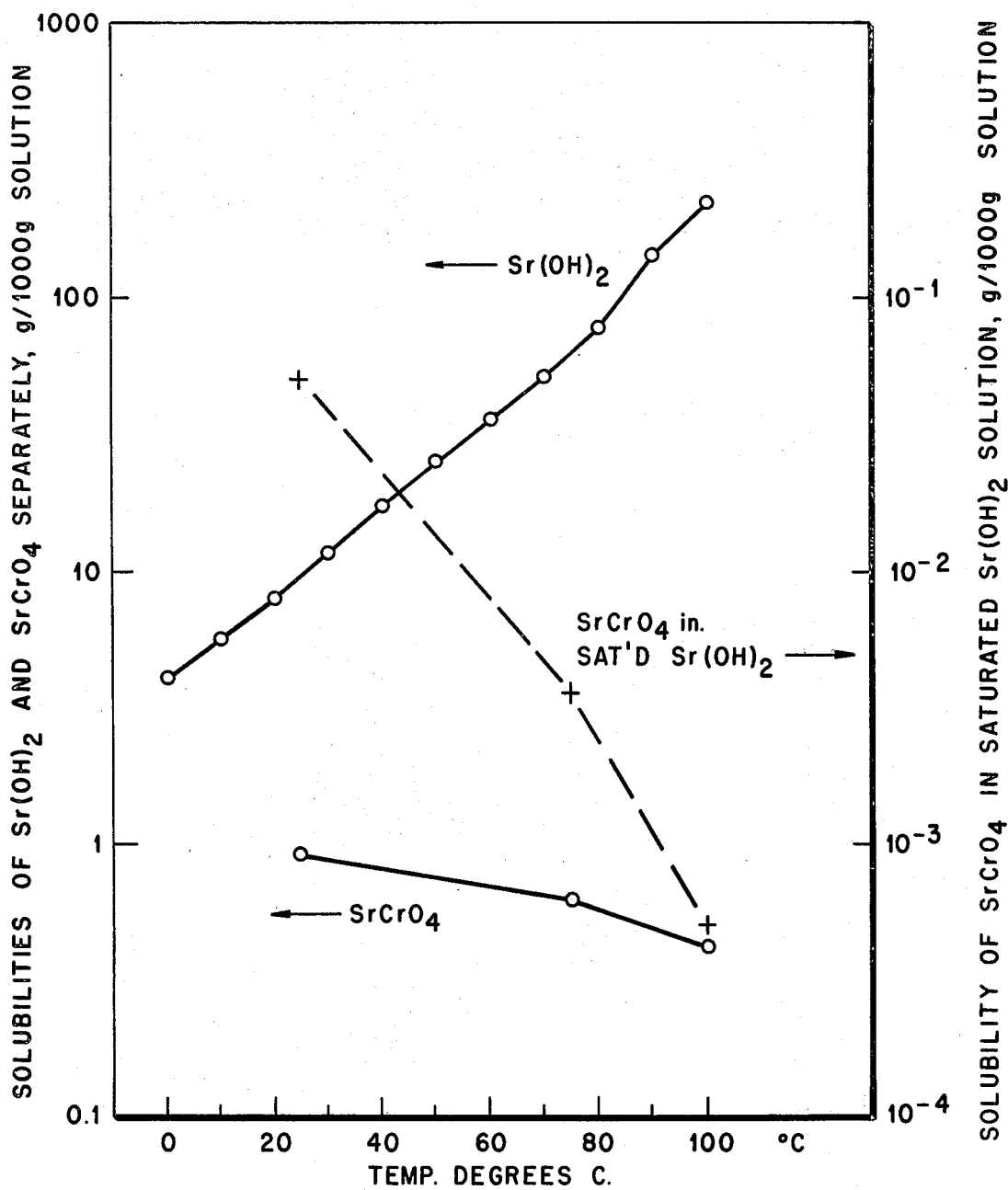
FIG. 2 is a solubility chart utilized in carrying out the process of this invention.

The fractional crystallization step is carried out by evaporating water to a point at which the solution contains only strontium hydroxide. At this point, strontium hydroxide and strontium chromate have been precipitated to the extent necessary to fulfill the requirements of reaction (2). This point is ascertained by utilizing solubility data contained in FIG. 2 of the drawing.

Reaction (2) is a totally anhydrous reaction. It is thus best carried out with particles as small as possible. Preferably these particles are within the size range of about 100 to 325 mesh. A reaction vessel having a means for continuously mixing the charge and exhausting the gaseous environment is preferably used in carrying out this reaction. A vessel material of copper or nickel is preferred. This reaction may be carried out within the temperature range of about 480° to 700° C but a temperature of 580° is preferably utilized. This reaction generally goes to completion in about 2 hours or less, depending upon the type of equipment used. The oxygen and $H_2O$ products are continuously exhausted from the reaction vessel during this time. The water can be separated by conventional condensation techniques. The oxygen can be additionally dried by the use of desiccants. The strontium hydroxychromate V product of reaction (2) is reused as a reactant in reaction (3).

The cycle is completed by using the strontium hydroxide which remains in the aqueous phase from the fractional crystallization step in reaction (1). The strontium hydroxide decomposes significantly to strontium oxide and water at a temperature of about 700° C. All of the water requirements for reaction (1) could be supplied by the water from the decomposition of strontium hydroxide. However, it has been found that the reaction does not proceed significantly utilizing this water. It has been found that a steam pressure of about one atmosphere must be maintained in order for the reaction to proceed even when strontium hydroxide is used as a reactant. Strontium hydroxide has a melting point of about 375° C. Reaction (1) thus uses a liquid reactant when using strontium hydroxide as a reactant at a temperature below which it decomposes.

Having generally described the process of this invention the following specific examples are given as a further aid to the understanding thereof.

EXAMPLE I

About 1.5 to 2 grams (RG) $Cr_2O_3$ were mixed with 8 grams $Sr(OH)_2$ by grinding together in a mortar. The powder was loaded into a platinum boat which was inserted into a silica tube and placed in a tubular horizontal furnace. A thermocouple and inlet lines and exit lines for gases were provided to the silica enclosure by means of a rubber stopper placed outside of the furnace. Steam was preheated to 300° C in a nickel container prior to entering the reaction chamber. Argon was additionally mixed with steam to provide an inert carrier for the hydrogen evolved. This diluted the hydrogen to explosion-safe concentrations and allowed for easy analysis by thermal conductivity after removal of the steam. The latter was accomplished by connecting the exit line to a water condenser and to a buret to measure the volume of condensed water as a function of time. This allowed for calculations of steam flow rates. The furnace temperature was continuously increased and the concentration of hydrogen recorded as a function of temperature. Evolution started at about 620° C and was maximum at about 700° C. Upon termination the solids were analyzer chemically and by X-ray diffraction and the total hydrogen evolved was estimated by integration of all the data. The agreement between the chemical analysis (degree of oxidation of chromium) and the amount of $H_2$ evolved was very good, within 2 to 5%.

EXAMPLE II 5.5 grams of $Sr(OH)_2.H_2O$ were mixed with 15 grams of $SrCrO_4$ by grinding and reacted in a manner similar to that described for reaction (1) except that no steam was provided. The concentration of oxygen in argon was measured by means of a "Beckman Oxygen Analyzer." The temperature of the furnace was slowly increased and oxygen evolution was noted at about 500° C with a maximum at 580° C. Chemical analysis and X-ray diffraction were used upon termination of the experiment and again good agreement was obtained.

EXAMPLE III

Each compound, $Sr_2CrO_4$ and $Sr_5(CrO_4)_3OH$, was hydrolyzed separately as indicated in eqs. (3a) and (3b). Typically 2–10 gram samples were used in coarse powder form, which was loaded into a glass tube with a coarse frit at the bottom. This container was located in a Soxhlet extractor connected to a 1 liter water boiler containing about ½ liter of water and a condenser. The whole system was sparged with flowing argon to prevent atmospheric $CO_2$ from reacting with the $Sr(OH)_2$ formed by the hydrolytic reaction. The sample was extracted for various periods up to 48 hours and the green solid left on the filter and the solution plus precipitate in the boiler were chemically analyzed. Additionally the green precipitate ($Cr_2O_3$) was also examined by X-ray diffraction. In some instances, for qualitative tests, small samples were boiled in large excesses of water with exclusion of air. The reaction started immediately.

EXAMPLE IV

Strontium chromate (VI) and strontium hydroxide produced by reaction (3) can be separated by fractional crystallization. In reaction (3), 2 moles of $Sr_2CrO_4$ (582.46g), ⅔ mole of $Sr_5(CrO_4)_3$ OH (535.39g), and 5 moles of $H_2O$ (90.08g) react to form 1 mole of $Cr_2O_3$ (151.99g), 2 moles of $SrCrO_4$ (407.22g), and 16/3 moles of $Sr(OH)_2$ (648.69g) in an excess of water. The reaction is conducted on the upper filter of a reflux extractor and the following results are achieved:

a. all of the insoluble $Cr_2O_3$ remains on the upper filter and is recycled to reaction (1), b. all of the $Sr(OH)_2$ and $SrCO_4$ are leached into the bottom vessel of the extractor.

In order to precipitate all of the $SrCrO_4$ in the bottom vessel, the solution is concentrated by boiling until the remaining liquid is saturated with $Sr(OH)_2$ at 100° C and contains 4 moles of $Sr(OH)_2$ (486.52g), which is the amount required to conduct reaction (1). By the data of FIG. 2 the concentration of such a solution is 218.34g $Sr(OH)_2$ per 1000g of solution (and 0.00056g $SrCrO_4$ per 1000g of solution). The contents of the bottom vessel are now filtered, still at 100° C, and 2 moles of $SrCrO_4$ (407.22g) and 4/3 moles of $Sr(OH)_2$ (162.17g) are recovered as filter cake and recycled in reaction (2). The filtrate comprises 486.52g $Sr(OH)_2$ and $(486.52/218.34) \times 1000g - 486.52g = 1741.7g$ of $H_2O$. This solution is concentrated to 4 moles $Sr(OH)_2.H_2O$ (s) (558.60g) and recycled in reaction (1), thus closing the thermochemical cycle.

It is thus seen that a novel hydrogen producing reaction as well as its incorporation into a novel cycle are provided by the well as its incorporation into a novel cycle are provided by the process of this invention. It is apparent that variations may be made in the process of this invention. Such variations may include the incorporation of the hydrogen producing reaction into another or similar cycle. Such variations, however, are included within the spirit and scope of the appended claims.

What is claimed is:

1. A thermochemical process for splitting water to produce hydrogen, comprising the steps of:
   reacting (1) chromium sesquioxide with strontium oxide and water to produce strontium orthochromate IV and hydrogen as reaction products;
   separating said hydrogen as a product of reaction;
   reacting (2) said strontium orthochromate IV and strontium hydroxychromate V with water to produce chromium sesquioxide, strontium chromate and strontium hydroxide as products;
   reusing the thus produced chromium sesquioxide in said first mentioned step of reacting;
   reacting (3) said strontium chromate with a portion of said strontium hydroxide to produce strontium hydroxychromate V, water and oxygen as products;
   separating said oxygen as a product;
   reusing said strontium hydroxychromate V as a reactant in said second mentioned step of reacting; and
   reusing the remaining portion of said strontium hydroxide to fulfill the strontium oxide requirement of said first mentioned step of reacting.

2. The process according to claim 1 wherein said first mentioned step of reacting is carried out at a temperature within the range of 600° to 800° C.

3. The process according to claim 1 wherein said third mentioned step of reacting is carried out at a temperature within the range of 80° to 100° C.

4. The process according to claim 1 wherein said second step of reacting is carried out at a temperature within the range of 480° to 700° C.

* * * * *